(12) United States Patent
Stasney, Jr.

(10) Patent No.: US 6,520,705 B2
(45) Date of Patent: Feb. 18, 2003

(54) CLAMPING ASSEMBLY

(76) Inventor: Wilson Frank Stasney, Jr., 1125 Lake, Clute, TX (US) 77531

(*) Notice: Subject to any disclaimer, the term of this patent is extended or adjusted under 35 U.S.C. 154(b) by 0 days.

(21) Appl. No.: 09/852,960

(22) Filed: May 10, 2001

(65) Prior Publication Data

US 2002/0168220 A1 Nov. 14, 2002

(51) Int. Cl.$^7$ .............................. F16B 9/00; F16L 3/24
(52) U.S. Cl. ...................................... 403/258; 248/72
(58) Field of Search .................. 403/259, 387, 403/403–406, 169–172, 399, 400, 384, 385; 248/72, 68, 73, 74.1, 74.4, 229.12, 229.22

(56) References Cited

U.S. PATENT DOCUMENTS

| | | |
|---|---|---|
| 252,679 A | 1/1882 | Knisely |
| 347,489 A | 8/1886 | Kenway |
| 415,689 A | 11/1889 | Williams |
| 470,102 A | 3/1892 | Canby |
| 535,094 A | 3/1895 | Edwards |
| 540,693 A | 6/1895 | Seely |
| 631,887 A | 8/1899 | Clark |

(List continued on next page.)

FOREIGN PATENT DOCUMENTS

DE  3110716  10/1982

OTHER PUBLICATIONS

Modern Hanger Corporation, catalogue, 1953, p. 32, "I–Beam Clamp and Bolt".

*Primary Examiner*—Robert E. Pezzuto
(74) *Attorney, Agent, or Firm*—Barbara J. Tribble

(57) ABSTRACT

A clamping assembly comprising two shoes, each shoe having a base from which depend spaced-apart ears, the ears cooperating with the base to form tapered recesses, each shoe further having a flange on the opposite side of the base from the ears, each flange having an aperture therethrough for receipt of a bolt, the two shoes being able to be cooperatively positioned such that the flanges are proximate to one another and tightening of a nut on the bolt decreases the space between the flanges, each shoe being formed from a single piece of metal. In one embodiment the flange of the clamping assembly further includes a hold-down edge, the axis of which is transverse to the axis of the bolt when the shoes are cooperatively positioned with the flanges proximate to one another but not necessarily in contact with one another. In another embodiment the clamping assembly firther comprises a utility article mounted to one shoe. Such utility article may be a support, such as a pipe support which can be mounted to the shoe by means of welding. In one embodiment the clamping assembly can be used by cooperatively positioning the shoes on a fixed object such as an I-beam and abutting and clamping thereto a substantially planar surface of an additional clampable object. The unique configuration of the assembly provides for easy fabrication and unexpected stability and performance under high loadings, as well as ease of application and removal.

10 Claims, 4 Drawing Sheets

U.S. PATENT DOCUMENTS

| | | |
|---|---|---|
| 680,604 A | 8/1901 | Young |
| 702,704 A | 6/1902 | Fischer |
| 808,648 A | 1/1906 | Staples |
| 893,378 A | 7/1908 | Rosenfeld |
| 919,558 A | 4/1909 | Doran |
| 966,906 A | 8/1910 | Grannis |
| 1,020,238 A | 3/1912 | Weer et al. |
| 1,202,640 A | 10/1916 | Ahlander |
| 1,245,047 A | 10/1917 | Sherman |
| 1,352,895 A | 9/1920 | Hoffman |
| 1,460,283 A | 6/1923 | Shutsa |
| 1,471,642 A | 10/1923 | Ready |
| 1,473,504 A | 11/1923 | Neely |
| 1,658,956 A | 2/1928 | Wehr |
| RE17,629 E | 3/1930 | Wehr |
| 2,678,786 A | 5/1954 | Kindorf |
| 2,916,244 A | 12/1959 | Renfroe |
| 3,124,330 A | 3/1964 | Robinson |
| 3,292,888 A | 12/1966 | Fischer |
| 3,298,646 A | 1/1967 | Van Buren, Jr. |
| 3,667,711 A | 6/1972 | Kissel |
| 4,305,561 A | 12/1981 | Hunter et al. |
| 4,371,203 A | 2/1983 | Munro |
| 4,379,651 A | 4/1983 | Nagashima |
| 4,570,885 A | 2/1986 | Heath |
| 4,611,776 A | 9/1986 | Williams |
| 4,826,113 A | 5/1989 | Winters |
| 5,595,363 A | 1/1997 | De Leebeeck |
| 5,863,020 A | 1/1999 | Olson et al. |

CLAMPING ASSEMBLY

BACKGROUND OF THE INVENTION

The present invention relates to means for clamping. In particular, the invention relates to a means for clamping that can be used for a variety of purposes, including supporting of pipe and maintaining the position of other relatively heavy objects as well.

A variety of clamping means are known in the art and are in many cases designed for use in specific applications. For example, German Patent DE 31 10716 A1 and U.S. Pat. Nos. 4,379,651 and 681,604 represent just a few of the myriad means of clamping known in the art, and further illustrate the fact that a number of industries have searched for such clamping means over many years. In general these clamping means are directed to ensuring maintenance of position, but variables such as loading levels and characteristics of the article itself whose position is to be maintained, including performance variables relating to the article's constituent materials, configuration and use conditions, continue to present unique challenges in designing clamps which perform optimally. In addition, opportunities are presented to find new uses for clamps which, by nature, offer temporary but relatively secure positioning and easy removal, for applications wherein heretofore more permanent affixment means were used.

One example where such relatively permanent positioning is conventionally employed is in supports for pipes. Typically, welding is employed to attach a supporting fixture, frequently on or to an I-beam or similar permanent structural element, while the pipe is typically enclosed by the supporting fixture in some way that severely restricts or prevents the pipe's lateral movement but which allows limited axial movement to compensate for metallurgical and physical reactions to fluids being carried by the pipe, to flow forces, and/or to external conditions. However, the affixment process itself, which as already noted frequently requires welding of the supporting fixture to the structural element, introduces potential dangers due to ignition of volatiles and/or flammable materials present in the local environment. Similarly, to remove such supporting fixtures in the event of a reconfiguration of the piping scheme, cutting implements such as acetylene torches again present the possibility of unintended ignition. For both affixment and removal, time and difficulty, and particularly the need for appropriately skilled labor such as welders, increase associated costs.

Accordingly, it would be useful in the art to have a means of easily and temporarily affixing pipe supporting fixtures, as well as other objects, in desirable positions, without the need for welding and similar affixment processes, whereby the position can be securely maintained despite high loadings and yet easily dismantled to accommodate desired changes in such positionings. In particular, it would be useful for this means to be able to be customized, particularly to a wide variety of such fixtures, to enable rapid deployment and re-deployment. Further, it would be desirable in the art for such means to be easily fabricated with as few parts as possible, such that performance weaknesses and failures resulting from the fabrication process itself can be minimized or eliminated.

SUMMARY OF THE INVENTION

Figure 1:
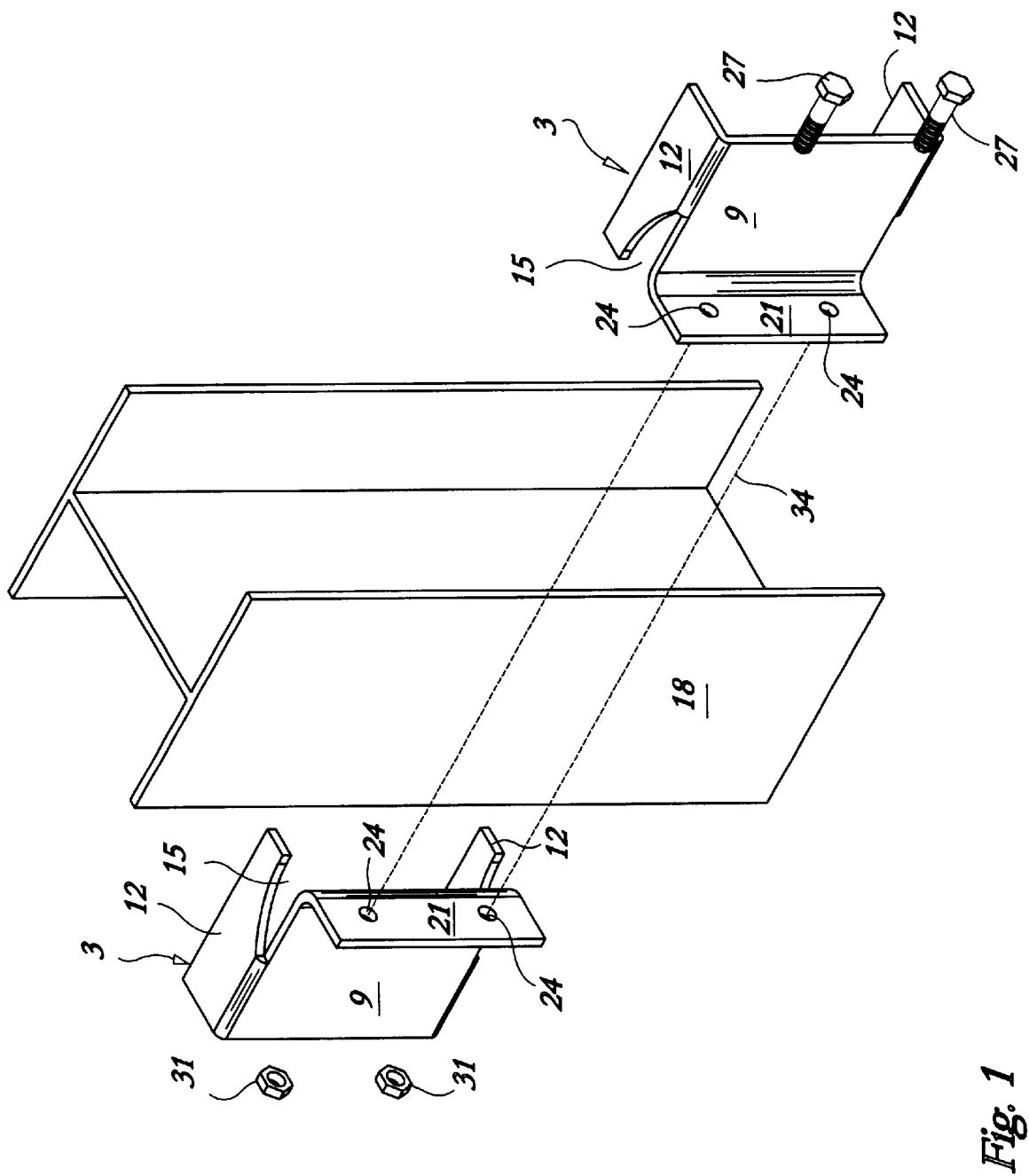
FIG. 1 is a perspective and exploded view of one embodiment of the clamping assembly of the present invention showing its two shoes 3 cooperatively positioned on the flange edges of an I-beam 6 without any object being clamped thereto.

The present invention is a clamping assembly which solves the problems described hereinabove, by providing a means of maintaining the position of a wide variety of items but including, in particular, pipe supporting fixtures, without the need for welding. Such clamping assembly offers the advantages of performing well in the presence of high loadings; easy fabrication; and easy removal to enable changes in positionings.

This clamping assembly generally comprises two shoes, each shoe having a base from which depend spaced-apart ears, the ears cooperating with the base to form tapered recesses, each shoe further having a flange on the opposite side of the base from the ears, the flange having an aperture therethrough for receipt of a bolt, the two shoes being able to be cooperatively positioned such that the flanges are proximate to one another and tightening of the bolt decreases the space between the flanges, each shoe being formed from a single piece of metal.

In one embodiment the flange of the clamping assembly further includes a hold-down edge, the axis of which is transverse to the axis of the bolt when the shoes are cooperatively positioned. In another embodiment the clamping assembly further comprises a utility article mounted to one shoe. Such utility article may be a support, such as a pipe support which can be mounted to the shoe by means of welding. The clamping assembly can be used particularly effectively when the shoes are cooperatively positioned on a clampable fixed object such as an I-beam. In that use the tapered recesses of the spaced-apart ears can operate to grasp the I-beam flange with significantly increased localized loading for improved maintenance of position.

The present invention further includes a method of securing an object having a substantially planar surface in a desired position against a clampable fixed object comprising (a) positioning a positionable object's substantially planar surface such that the substantially planar surface abuts a substantially planar surface of a clampable fixed object; (b) positioning the clamping assembly of claim 2 and tightening the nut on the bolt thereof sufficiently such that the base overrides both substantially planar surfaces and the spaced-apart ears grasp the clampable fixed object sufficiently to maintain the substantially planar surfaces in proximate positions.

The present invention also includes a method of securing an object having a substantially planar surface in a desired position against a clampable fixed object comprising (a) positioning a positionable object's substantially planar surface such that the substantially planar surface abuts a substantially planar surface of a clampable fixed object; (b) positioning the clamping assembly, in the embodiment having a hold-down edge, and tightening the nut on the bolt thereof sufficiently such that the hold-down edge overrides the object's substantially planar surface and the spaced-apart ears grasp the clampable fixed object sufficiently to maintain the substantially planar surfaces in proximate positions. In embodiments without the hold-down edge, it is preferred that the object's substantially planar surface be of insignificant thickness such that tightening of the nut on the bolt does not interfere with the cooperation of the shoes by causing canting of the proximate flanges.

Finally, the present invention includes a method of supporting a supportable object in a desired position against or near a clampable fixed object comprising (a) positioning the clamping assembly, in the embodiment including a utility article which is a support, and tightening the bolt thereof sufficiently such that the spaced-apart ears grasp the clampable fixed object and the clamping assembly maintains its position thereon; (c) positioning a supportable object on the support, and, optionally, (d) securing the supportable object to the support.

DETAILED DESCRIPTION OF THE INVENTION

The present invention offers a combination of features that provide the advantages of greater ease and economy of manufacture than clamping assemblies currently used in many industries; excellent maintenance of position despite high loadings; easy application; and convenient and safe substitution for welding processes currently in use in many industries.

A particular advantage of the present invention is its versatility for use in pipe support, enabling rapid set-up and dismantling and complex configurations, while avoiding the need for welding in many cases. This is particularly advantageous where arc welding in the presence of atmospheric volatiles may lead to explosions and/or fire. The clamping assembly can be itself easily manufactured off-site, in some embodiments from a single piece of metal using appropriate "breaking" to attain the desired shape of each shoe. Where additional fixtures, such as supports including angle iron-type constituents are desired, such can be affixed via welding which can be carried out off-site.

Key to the particular efficacy of the present invention is that the clamping assembly comprises two shoes which can be cooperatively positioned around an appropriate clampable fixed object, such as, for example, an I-beam. This imparts unusual stability to the assembly as a whole as well as ease of application. With reference to FIG. 1, each shoe 3 consists of a base 9 from which depend the spaced-apart ears 12. These ears 12 cooperate with the base 9 to form tapered recesses 15. The tapered recesses 15 serve to increase the flexibility of substrate selection and at the same time increase the localization of loading on the substrate to maximize hindrance of movement when the shoe has been properly applied to the clampable substrate 18. Each shoe 3 further has a flange 21 on the opposite side of the base 9 from the ears 12, and this flange 21 has one or more apertures 24 therethrough for receipt of a corresponding number of bolts 27. In use, the two shoes 3 are capable of being cooperatively positioned with the bolt or bolts 27 through both flanges 21 which are proximate to one another, the bolt or bolts 27 being secured by a nut or nuts 31. In this position tightening of the nuts 31 serves to effectively decrease the space 34 between the proximate flanges 21 and therefore between the shoes 3. Where opposing edges of a clampable substrate 18 are positioned appropriately within the tapered recesses 15 of each shoe 3, such tightening increases the security of affixment of the clamping assembly as a whole on the clampable substrate 18. Because each shoe 3 is formed from a single piece of metal which has been "broken", the metallurgical term for formation via cold-bending, the shoes can be easily manufactured and avoid the potential differences in loading capability, and potential introduction of performance weakness, that may be encountered when formation is via welding of two or more constituent parts per shoe, or other fabrication methods requiring attachment of parts.

Figure 2A:
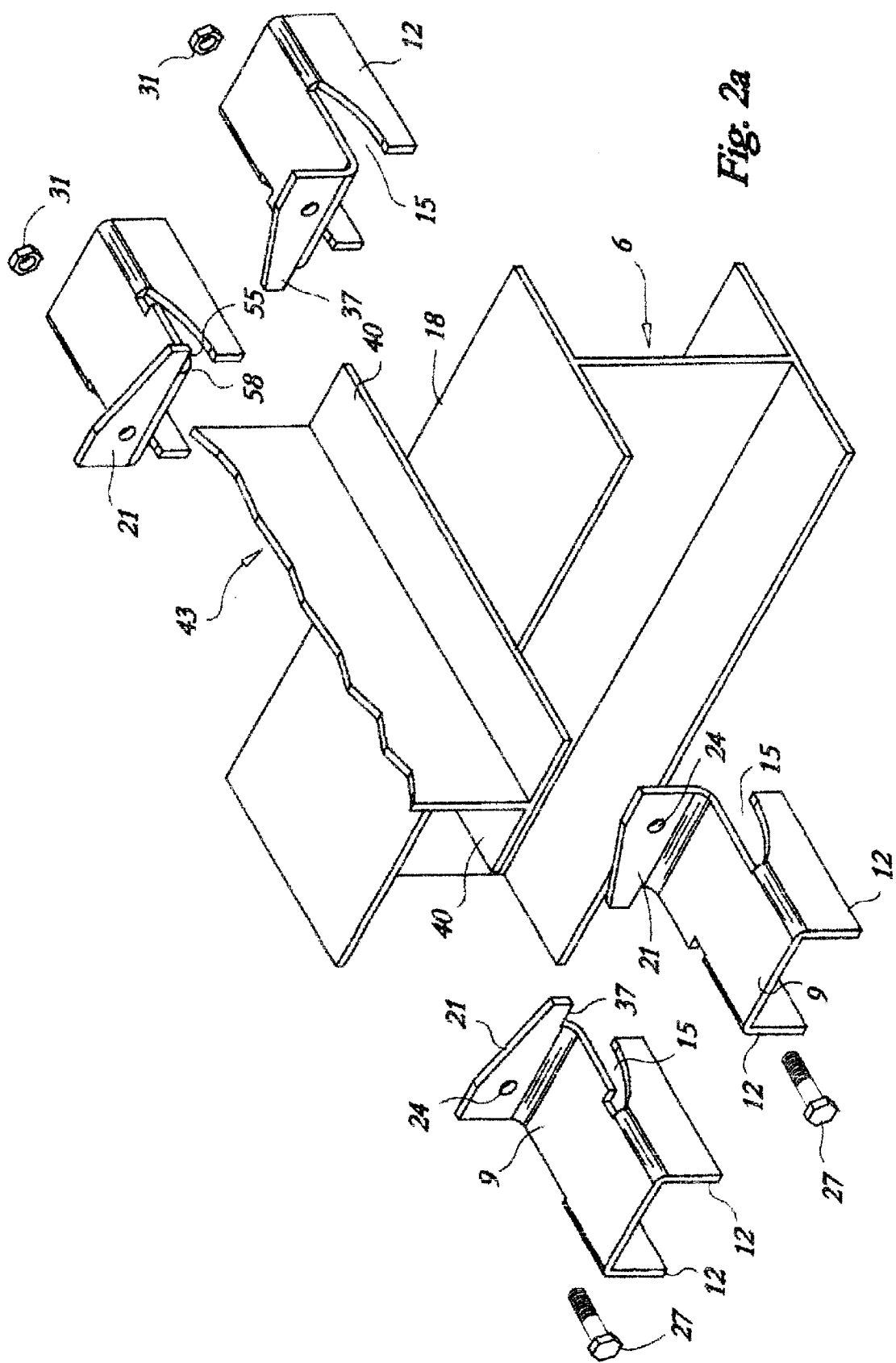
FIG. 2a is a perspective and exploded view of one embodiment of the clamping assembly in which the shoes 3 have hold-down edges 37 having axes transverse to the axis of the bolt or bolts 27 which maintains their cooperative positioning.
Figure 2B:
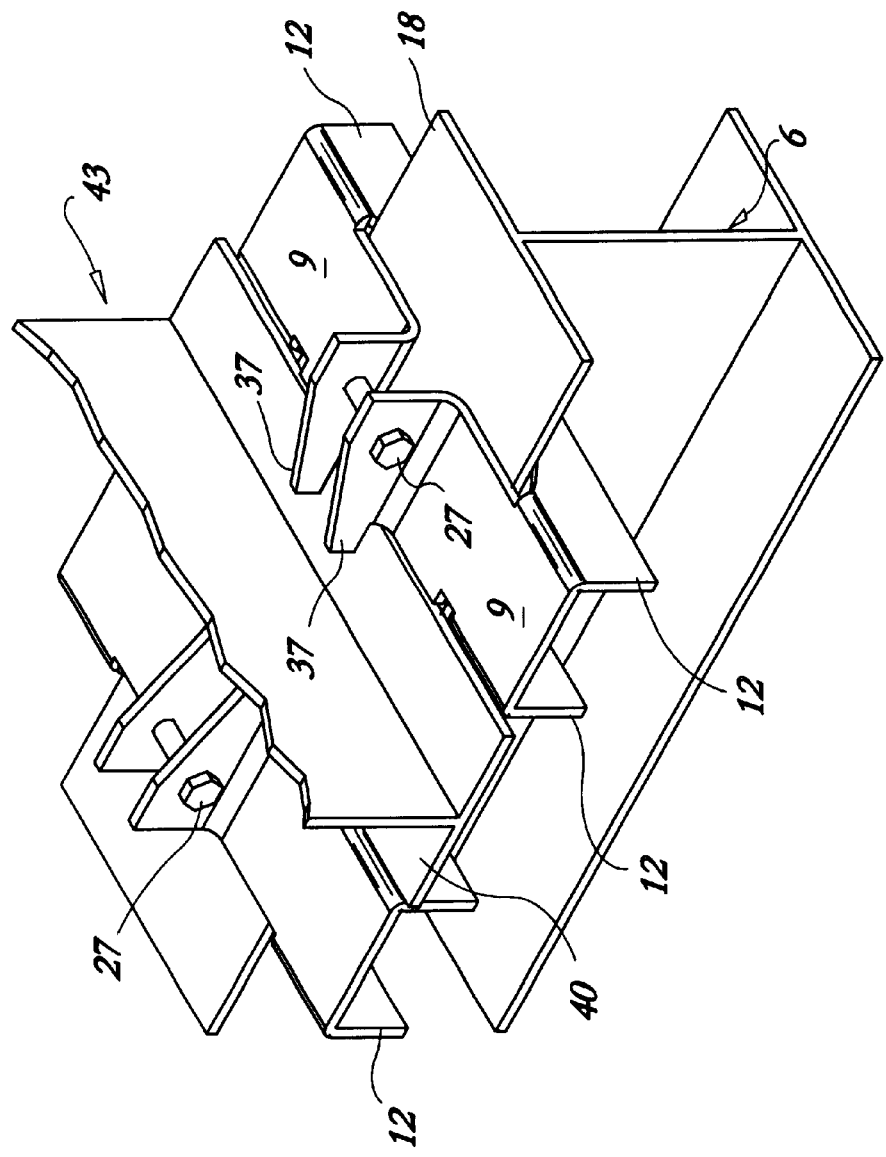
FIG. 2b is an unexploded perspective view of the same embodiment, having hold-down edges 37, and with a substantially planar surface 40 of one type of pipe support 43 clamped thereunder.

FIG. 2a and FIG. 2b show one embodiment of the clamping assembly of the present invention in which the flange 21 of each shoe 3 further includes a hold-down edge 37, the axis of which is transverse to the axis of the bolt or bolts 27 when the shoes 3 are cooperatively positioned on a clampable substrate 18 of a clampable fixed object 6 such as an I-beam. This embodiment offers the capability of entrapment of a relatively flat, but significantly thick, edge of an object desired to be held against the clampable substrate 18. FIG. 2a shows in exploded view an embodiment wherein the hold-down edges 37 of each shoe 3 are positioned over a receptive edge 40 of what might be, for example, a pipe support assembly 43. In this position the pipe support assembly 43 is held in place easily and securely, yet can be removed at will without the need to cut welds. FIG. 2b shows the same embodiment in unexploded use as applied to the clampable fixed object 6.

Figure 3:
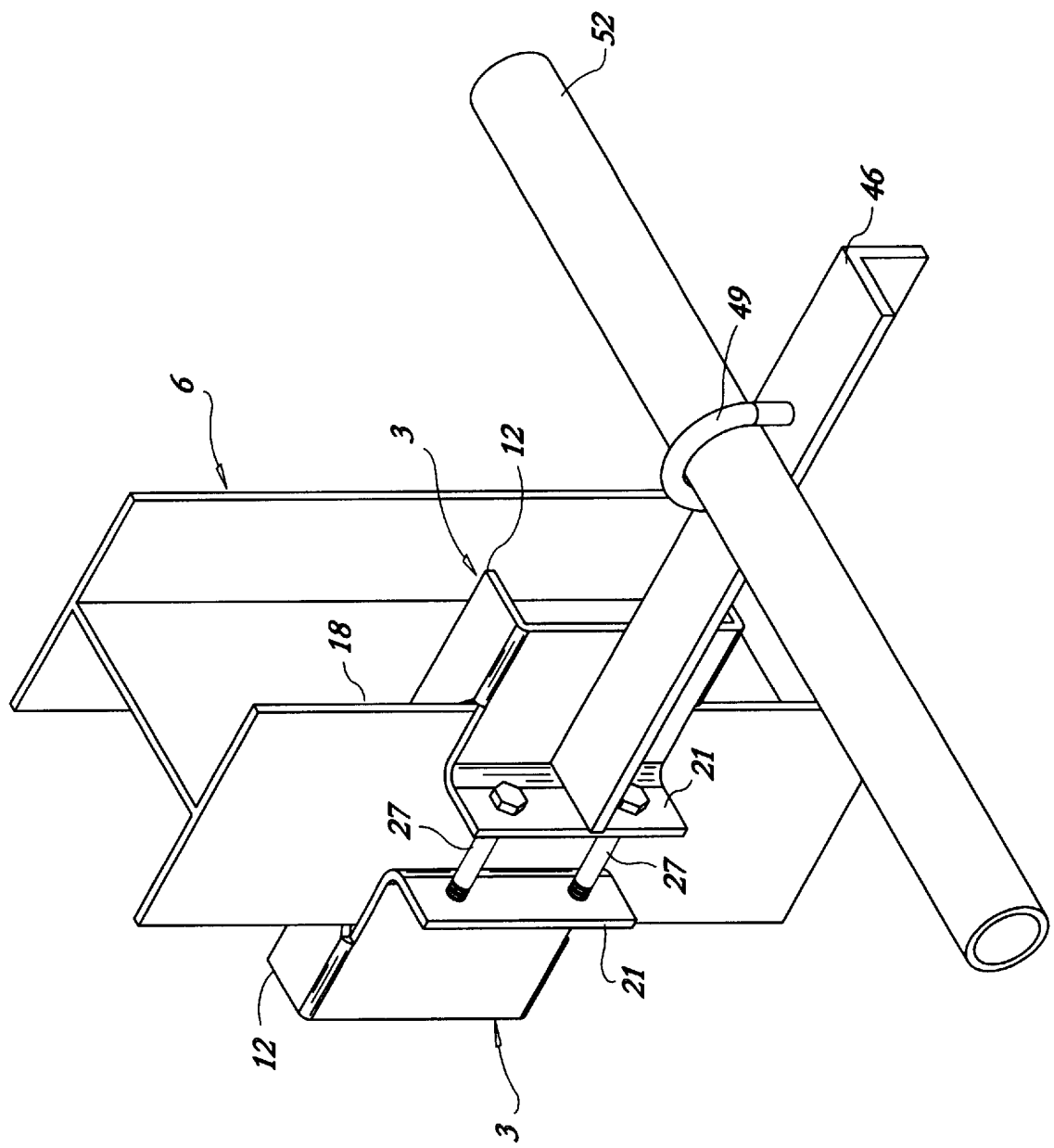
FIG. 3 is a perspective view of another embodiment of the clamping assembly in which a utility article 46, which herein is a simple pipe support of the angle iron type, is attached to one shoe 3 of the clamping assembly. The utility article 46 is shown supporting a pipe 52 which is maintained in position by means of a conventional "U" clamp 49.

FIG. 3 shows another embodiment of the clamping assembly. In this embodiment a utility article 46 is mounted to one shoe 3. Such utility article 46 is, in this drawing, an angle-iron type support, which can be mounted to the shoe 3 by means of welding to base 9 and also, in this embodiment, to flange 21, during the clamping assembly fabrication process. The support may be of a variety of configurations such that the object to be supported can be rested on or hung therefrom, and can be held in place via further restraining or locking systems such as an appropriately placed "U" clamp or other means. In FIG. 3 a conventional "U" clamp 49 is shown ready to receive a pipe 52 for rapid set-up of even complex piping configurations. The shoes 3 themselves are shown cooperatively positioned on a clampable fixed object 6 where effective tightening of the nuts (not shown) on their corresponding bolts 27, positioned through the apertures 24 of both flanges 21, results in high localized loading by the spaced-apart ears 12 against the clampable substrate 18 which has been positioned within the tapered recesses (not shown). Excellent maintenance of position can be attained.

Selection of the appropriate embodiment of the present invention will depend, first, upon whether the purpose of the clamping assembly is to enable secure positioning of a utility article mounted on a shoe of the clamping assembly, or planar surface-to-planar surface affixment of two clampable objects, such as, for example, as is shown in FIG. 2a and FIG. 2b. Where such surface-to-surface affixment is desired, such selection will further depend upon the relative thickness of the surface which will be located on the side of the base 9 having the flange 21. For example, where the surface to be positioned at this location is substantially planar but of insignificant thickness, the clamping assembly such as is shown in FIG. 1, without the hold-down edge, may be an appropriate selection. By "insignificant thickness" is meant any thickness that does not substantially interfere with the cooperation between the two shoes 3 to maintain the position of the object being clamped. Such interference could manifest itself by a canting or tilting of the base(s) 9 of one or both shoes 3 that interferes with the proper tightening of the nut(s) 31 on the bolt(s) 27. The opposite, "significant thickness", therefore means any thickness that would substantially interfere with such cooperation and which requires the presence of the inherently "raised" hold-down edge 37 to reduce or eliminate this interference. Obviously, the hold-down edge's exact configuration, particularly the space between its lower edge 55 and the surface 58 (see FIG. 2a) of the shoe 3 which will abut the clampable fixed substrate 18, that is, the surface on the opposite side of the base from that from which the flange 21 extends, can be customized for its desired application during the fabrication process.

What I claim is:

1. A clamping assembly comprising two shoes, each shoe having a base from which depend spaced-apart tapered ears, said ears aligned with each other and integral with the base at the side thereof, the ears cooperating with the base in a plane perpendicular to the plane of the base to form tapered recesses, each shoe further having a flange on the end of the base that is proximate to where the tapered recesses are greatest, the flange being perpendicular to the plane of the tapered ears and to the plane of the base and oriented in a direction away from the tapered ears and having an aperture therethrough for receipt of a bolt, the two shoes being able to be cooperatively positioned such that the flanges are proximate to one another and tightening of a nut on the bolt decreases the space between the flanges, each shoe being formed from a single piece of metal.

2. The clamping assembly of claim 1 wherein the flange further includes a hold-down edge, the axis of which is transverse to the axis of the bolt when the shoes are cooperatively positioned and the bolt is applied through the flanges of each.

3. The clamping assembly of claim 1 further comprising a utility article mounted to one shoe.

4. The clamping assembly of claim 3 wherein the utility article is a support.

5. The clamping assembly of claim 4 wherein the support is a pipe support which is mounted to a shoe by means of welding.

6. A method of securing an object having a substantially planar surface in a desired position against a clampable fixed object comprising (a) positioning an object's substantially planar surface such that the substantially planar surface abuts a substantially planar surface of a clampable fixed object; (b) positioning the clamping assembly of claim 2 and tightening the nut on the bolt thereof sufficiently such that the base overrides both substantially planar surfaces and the spaced-apart ears grasp the clampable fixed object sufficiently to maintain both substantially planar surfaces in proximate positions.

7. A method of securing an object having a substantially planar surface in a desired position against a clampable fixed object comprising (a) positioning a positionable object's substantially planar surface of significant thickness against a substantially planar surface of a clampable fixed object; (b) positioning the clamping assembly of claim 2 and tightening the nut on the bolt thereof sufficiently such that the hold-down edge overrides the positionable object's substantially planar surface and the spaced-apart ears grasp the clampable fixed object sufficiently to maintain both substantially planar surfaces in proximate positions.

8. The method of claim 7 wherein the object is a pipe shoe and the clampable fixed object is an I-beam.

9. A method of supporting a supportable object in a desired position against or near a clampable fixed object comprising (a) positioning the clamping assembly of claim 4 and tightening the nut on the bolt thereof sufficiently such that the spaced-apart ears grasp the clampable fixed object and the clamping assembly maintains its position thereon; (c) positioning a supportable object proximate to the support, and, optionally, (d) securing the supportable object to the support.

10. The method of claim 9 wherein the supportable object is a pipe; the support is a pipe support; and the clampable fixed object is an I-beam.

* * * * *